April 12, 1927.
D. C. DAVIS
AUTO STOP GOVERNOR
Filed May 10, 1921
1,624,093
3 Sheets-Sheet 1
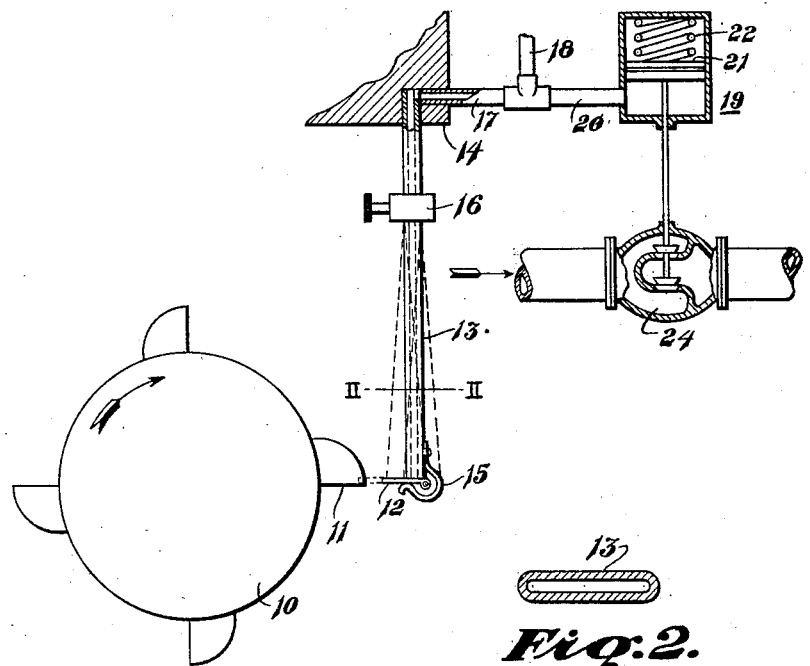
Fig. 1.
Fig. 2.
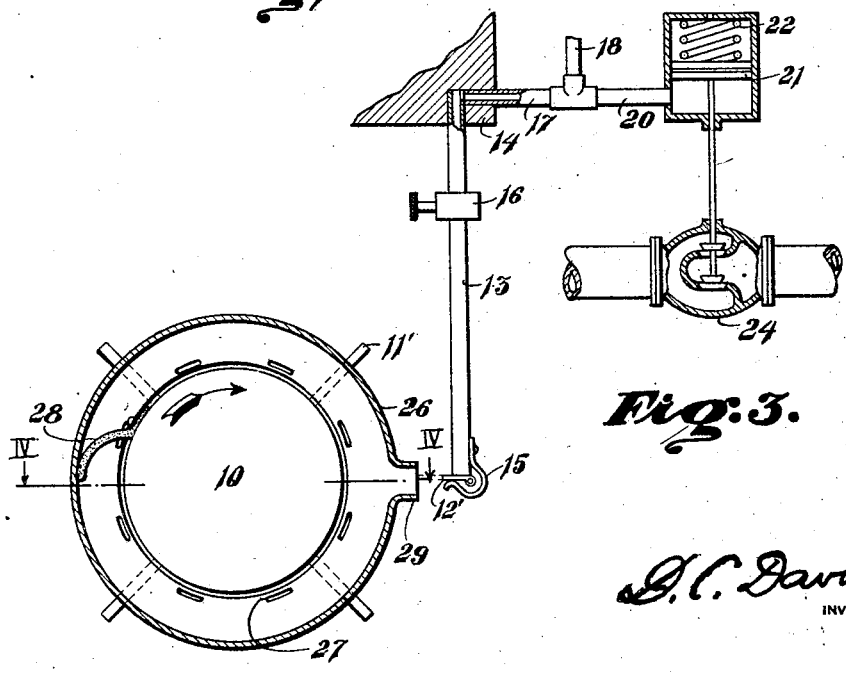
Fig. 3.
D. C. Davis
INVENTOR April 12, 1927.

D. C. DAVIS 1,624,093

AUTO STOP GOVERNOR

Filed May 10, 1921

3 Sheets-Sheet 2

D. C. Davis
INVENTOR

April 12, 1927.

D. C. DAVIS 1,624,093

AUTO STOP GOVERNOR

Filed May 10, 1921

3 Sheets-Sheet 3

D. C. Davis
INVENTOR

Patented Apr. 12, 1927.

1,624,093

UNITED STATES PATENT OFFICE.

DAVID C. DAVIS, OF CHESTER, PENNSYLVANIA, ASSIGNOR TO WESTINGHOUSE ELECTRIC AND MANUFACTURING COMPANY, A CORPORATION OF PENNSYLVANIA.

AUTO-STOP GOVERNOR.

Application filed May 10, 1921. Serial No. 468,310.

My invention relates to auto-stop governors as are commonly employed in connection with steam turbines, rotary converters and other forms of rotatable apparatus to prevent over-speeding thereof and it has for its object to provide apparatus of the character designated which shall be simple, reliable and effective in operation and which shall be relatively inexpensive in construction and maintenance, together with ready adjustabililty to provide for various normal running speeds.

Figure 4:
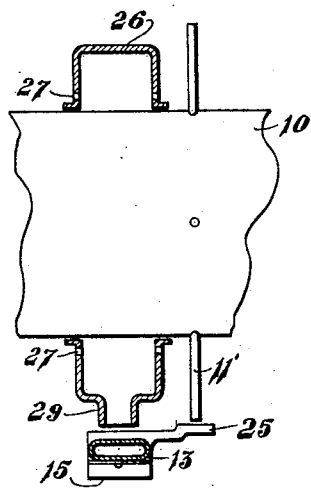
Figure 5:
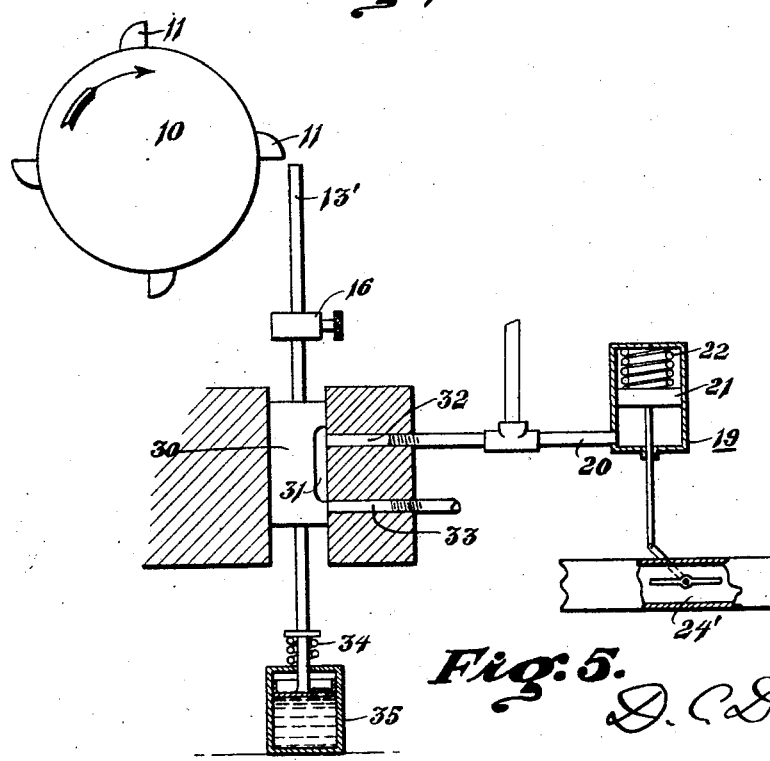
Figure 6:
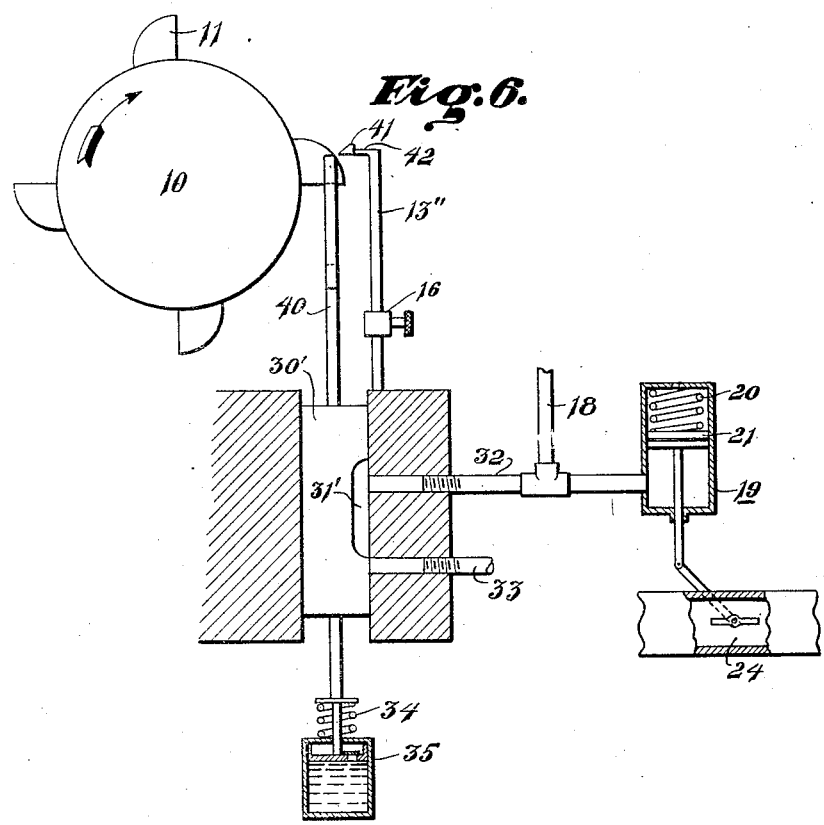
Figure 7:
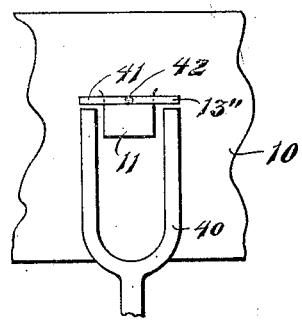

In the accompanying drawing, Figure 1 is a diagrammatic view of one form of apparatus embodying my invention; Figure 2 is a transverse sectional view of the reed or vibratory member employed in the structure of Figure 1, to be taken on the line II—II of Figure 1; Figures 3 and 4 are diagrammatic views, partially in section, of a modification of the apparatus shown in Figure 1, Figure 4 being taken on the line IV—IV of Figure 3; Figure 5 is a diagrammatic view of another modification of the apparatus shown in Figure 1; and Figures 6 and 7 are views of still another form of apparatus of the character designated.

Prime movers, such as steam and gas engines and steam turbines, particularly the latter, are in general provided with an emergency auto-stop governor in addition to the usual governing means in order to prevent racing or running away of the rotatable element in the event of the failure of the usual governing means. In accordance with the present invention, I mount a vibratory member or reed in contact with some portion of the machine to be controlled and I then tune this reed to a somewhat higher pitch than that determined by the desired speed of rotation. Means are further provided whereby, upon pronounced vibration of said reed, caused for example, by an increase in the speed of the rotatable member so as to generate a vibratory force corresponding to the pitch of the reed, means are brought into play for the stoppage of the prime mover or other rotatable element. Under certain conditions, as with turbine spindles which have been very carefully balanced, it may well be that the vibration is not sufficiently marked to operate a device of the character above indicated and under these conditions I provide special means for setting up an intermittent force proportional to the speed of the rotatable element, this force being caused to act upon the vibratory reed.

Referring to the drawing for a more detailed understanding of my invention, I show a rotatable shaft at 10 in Fig. 1, such for example as the shaft of a steam turbine. Suitable teeth 11—11 are mounted thereupon and are arranged, in normal operation, to just clear a small flap valve 12, closing the end of the hollow reed. The vibratory member 13 is mounted on the turbine as indicated at 14. The valve 12 is normally held closed, as by a spring 15. The pitch of the reed 13 may be adjusted as by a sliding weight 16.

The interior of the reed 13 is in communication with a source of oil pressure, such as the oiling system of the turbine, through conduits 17 and 18 and these conduits are further in communication with the interior of a cylinder 19, through a conduit 20. The cylinder 19 contains a piston 21 which is urged upwardly by oil pressure transmitted through the conduit 20 and in opposition to the force exerted by a spring 22. A spindle 23 connected to the piston 21 controls a throttle valve 24 in the steam-supply line of the turbine, the arrangement being such that the valve 24 is opened in the upward position of the piston 21 and is closed in the downward position thereof.

The reed 13 is preferably of flat elliptical cross-section, as shown in Figure 2, so that it may have considerable transverse resiliency, while at the same time affording an oil passage therethrough of considerable size.

Having thus described the arrangement of the system shown in Figure 1, the operation thereof is as follows: Assume the turbine to run at 1800 R. P. M., the existence of a slight degree of unbalance in the spindle tends to vibrate the entire turbine structure at a corresponding frequency. Under these conditions, the reed 13 is tuned to have a natural rate of vibration of, for example, 2000 per minute, as by the adjustment of the sliding weight 16. Under these conditions, the reed 13 does not vibrate to an appreciable extent at normal speed in the turbine and the teeth 11—11 just clear the valve 12. The valve 12 therefore remains closed and oil pressure from the conduit 18 builds up within the lower end of the cylinder 19, holding the throttle valve 24 in its open position.

Upon over-speeding of the turbine to, for example, 2000 R. P. M. the natural period of the reed 13 is reached and pronounced vibration is set up therein, the reed swinging, for example, to the dotted positions indicated. The edge of the valve 12 is therefore brought under the teeth 11 and these teeth strike in rapid succession, holding the valve 12 open and permitting the escape of oil through the conduit 17 and the interior of the reed so that the pressure drops within the lower end of the cylinder 19, permitting the spring 22 to close the throttle 24 and to cut off the steam supply to the turbine.

In the case of turbines which have been given a very accurate running balance as by the use of a dynamic balancing machine, it may happen that the vibration is not sufficiently pronounced to positively operate the structure shown in Figure 1 and under these conditions it is desirable to employ the form of apparatus shown in Figures 3 and 4. The shaft 10 is provided, as before, with outwardly extending teeth or engaging members 11', these being arranged to engage an outwardly extending arm 25, mounted on a valve 12' arranged on the end of a reed 13 as in the structure of Figure 1. An annular housing 26 is disposed around the shaft 10 and is provided with suitable openings 27 adjacent its inner edge. A blade 28 is mounted on the shaft 10 for rotation within the housing 26 and by its rotation draws air inwardly through the openings 27, and expels this air in the form of intermittent puffs through a nozzle 29 directed toward the lower end of the reed 13, the purpose of the arm 25 being to permit offsetting of the reed 13 from the plane of rotation of the teeth 11' so as to be acted upon by the intermittent puffs of air projected from the casing 26.

The operation of the structure shown will be obvious from the description given of the operation of the apparatus of Figure 1. During normal operation, the puffs or pressure waves emitted from the nozzle 29 having a frequency of, for example 1800 per minute, cause little or no vibration of the reed 13, which is tuned to 2000 per minute. Upon the attainment of overspeed in the shaft 10, the intermittent puffs or pressure waves attain a frequency of two thousand per minute and cause pronounced vibration of the reed 13, bringing the arm 25 into engagement with the teeth 11' and relieving the oil pressure within the cylinder 19, as before described.

While I have shown the plate 28 as operating in air, it is obvious that it may operate in a similar manner with any other ambient medium, such, for example, as oil or water, causing this medium to be expelled or vibrated through the nozzle 29.

Referring to the form of apparatus shown in Figure 5, a shaft 10 is provided with teeth 11, as before, and the vibratory member 13' carrying a rider 16, is mounted so that its upper end just clears the teeth 11, in the absence of vibration. The reed 13' is mounted on a piston valve 30 arranged to normally prevent the escape of oil from a conduit 18 so as to build up pressure in a cylinder 19 as before and to hold open the throttle 24'. This action is effected, as shown, by having the passage 31 of the piston valve 30 normally in alinement with a port 32 and out of alinement with an overflow or relief port 33. The piston 30 and the reed 13' are normally held in this position as by a spring 34 and the movement thereof is further controlled by a dash-pot 35 permitting rapid downward movement but slow upward movement.

Having tuned the apparatus thus described as in the foregoing structures, the various parts normally remain in the positions shown in Figure 5 but upon the attainment of overspeed in the shaft 10 and consequent excessive vibration of the reed 13', the teeth 11—11 engage the upper end of the reed 13', forcing the same downwardly against the spring 34 and bringing the fluid passage 31 into alinement both with the ports 32 and 33, relieving the pressure within the cylinder 19 and permitting the spring 22 to close the throttle 24'. The prompt return of the piston 30 and reed 13' to their upper positions is retarded by the dash-pot 35.

In the event that it be not desired to act directly upon the vibratory reed by the rapidly rotating teeth, the structure shown in Figures 6 and 7 may be employed. A shaft 10 carrying teeth 11—11 rotates in proximity to a forked member 40, the teeth 11 normally passing freely between the arms of this member as is clearly indicated in Figure 7. The member 40 is mounted on a piston 30' arranged to control the throttle exactly as in the system of Figure 5. A reed 13'' is mounted in proximity to the member 40 and carries at its upper end a cross-bar 41 arranged to swing just above the ends of the arms of the member 40, this cross-bar being preferably attached to the reed 13 through a resilient arm 42.

In normal operation, in the absence of marked vibration in the reed 13'' the bar 41 remains out of range of the teeth 11 and these teeth pass freely between the arms of the member 40. Upon the attainment of marked vibration in the reed 13'', the cross-bar 41 first swings above the ends of the member 40 and is then engaged by the teeth 11—11, in turn engaging the ends of the member 40 and forcing the same downwardly, closing the throttle 24 as described in connection with Figure 5. The cross-bar 41 may be forced downwardly to a considerable extent without injuring the reed 13'' because of the resiliency of the arm 42.

I am aware of United States Patent No. 1,023,886 issued to the Colonial Trust Company on April 23, 1912, on an application filed by John E. Snyder and the apparatus shown by me differs from that of said patent in that it embodies means for tuning to a speed higher than that normally desired although the apparatus shown by me will respond to forced vibrations set up by blade rubbing or other abnormal causes as does that of Snyder.

While I have shown my invention, for convenience, in connection with a steam turbine and with the throttle therefor, it is obvious that it is equally applicable to the emergency control of steam engines of the reciprocating type or of internal combustion engines, and it is further obvious that it may be applied as an emergency stop for electrical apparatus, such for example as rotary converters, in which case a switch or switches are rendered subject to control rather than a throttle, all as will be obvious to those skilled in the art.

While I have shown my invention in a plurality of forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a rotatable member, of driving means therefor, a blade connected to said rotatable member and arranged to produce intermittent pressure waves in its ambient medium, a vibratory member disposed to be subject to said waves and tuned to a predetermined higher pitch than that corresponding to the frequency of said waves at the desired speed of said rotatable member, and means whereby vibration of said vibratory member in excess of a certain amount de-energizes said driving means.

2. The combination with a valve for a fluid motor, of means for biasing the valve in a closing direction, fluid-pressure means for holding the valve open, a vibratory member, relief means for said fluid-pressure means and carried by said vibratory member, and means for opening the relief means upon a predetermined amplitude of vibration of the vibratory member.

3. In combination with a valve and a rotary member for a fluid motor, an abutment connected to the valve, means effective to move the valve in a closing direction, fluid pressure means cooperating with the abutment to move the valve in an opening direction, a vibratory member having a natural period of vibration differing from the normal period of rotation of the rotary member, means carried by the rotary member for effecting vibration of the vibratory member, and relief means for the fluid pressure means actuated by the vibratory member upon a predetermined amplitude of vibration whereby, when the rotary member attains a speed corresponding to the natural period of the vibratory member, said member vibrates and the fluid pressure means is relieved.

4. The combination with a valve and a rotary member for a fluid motor, of means for biasing the valve in a closing direction, fluid-pressure means for holding the valve open, rotary abutments carried by the rotary member, and vibratory means adapted to cooperate with the rotary abutments at a predetermined speed of the motor to relieve the pressure of said fluid-pressure means.

5. The combination with a valve for a fluid motor, of spring means for moving the valve in a closing direction, fluid-pressure means for moving the valve in an opening direction, a vibratory member, and means effective upon a predetermined amplitude of vibration of the vibratory member to relieve the pressure of said fluid-pressure means so that the spring may close the valve.

6. The combination with a motive fluid supply valve and a rotary member for a fluid motor, of fluid pressure actuated means for normally holding the motive fluid supply valve open, biasing means for closing the valve upon relief of the fluid pressure means, a vibratory member tuned to a different pitch than the normal period of rotation of the rotary member and adapted to relieve the fluid pressure means, and means carried by the rotary member for effecting vibration of the vibratory member and adapted upon a predetermined amplitude of vibration thereof to engage therewith and relieve the fluid pressure means.

In testimony whereof, I have hereunto subscribed my name this 29 day of April, 1921.

DAVID C. DAVIS.